…

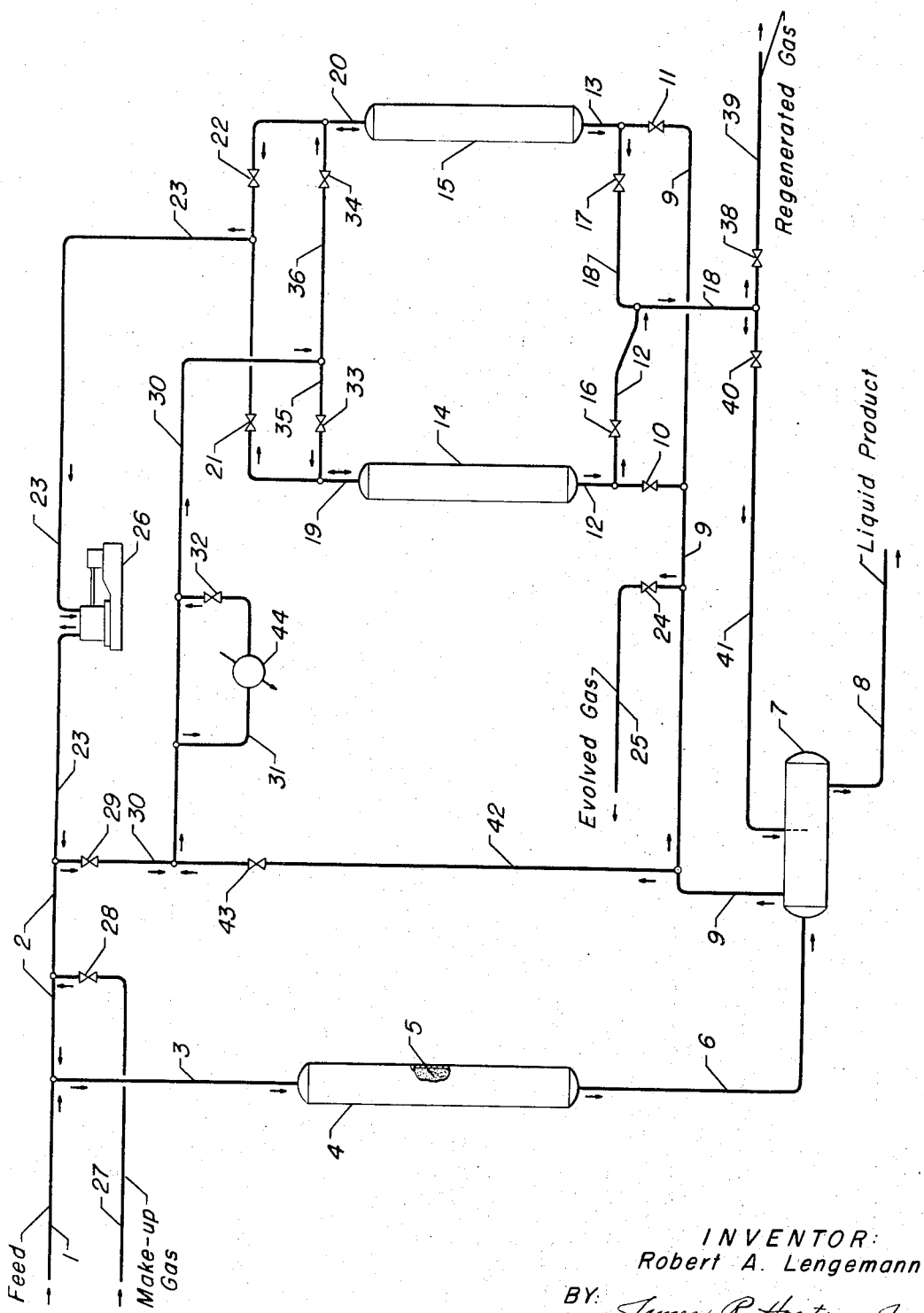

United States Patent Office 3,359,198
Patented Dec. 19, 1967

3,359,198
GAS PURIFICATION METHOD
Robert A. Lengemann, Arlington Heights, Ill., assignor to Universal Oil Products Company, Des Plaines, Ill., a corporation of Delaware
Filed July 9, 1965, Ser. No. 470,829
7 Claims. (Cl. 208—111)

This invention relates to improving the purity of recycle gas in continuous processing units. More specifically this invention relates to the treatment of the recycle gas in a continuous catalytic process by contact with a solid bed of adsorbent to remove undesirable components from the recycle gas. Still more specifically, this invention relates to improving catalyst stability in a catalytic hydrocarbon conversion process in which at least a portion of the hydrogen effluent is recycled to the catalyst zone by contacting the recycle gas with a solid adsorbent bed to remove non-hydrogen components therefrom and recycling the enriched hydrogen purity gas to the catalytic zone. This invention further relates to a method for continuously producing enriched hydrogen purity gas by employing at least two beds of solid adsorbent, regenerating one of the beds and employing the other to remove non-hydrogen components and periodically switching the beds.

In one of its embodiments this invention relates to the treatment of a separator recycle gas wherein the recycled gas is contacted with a first bed of active solid adsorbent selective for non-hydrogen components to produce an enriched hydrogen purity gas, recycling a portion of the enriched hydrogen purity gas to the catalyst zone and utilizing a second portion of the enriched hydrogen purity gas as a stripping aid to regenerate a second bed of deactivated solid adsorbent maintained at regeneration conditions and periodically switching the first and second beds to continuously produce an enriched hydrogen purity gas.

In another of its embodiments this invention relates to the treatment of a separator recycle gas wherein a first portion of the recycle gas is contacted with a first bed of active solid adsorbent selective for non-hydrogen components to produce an enriched hydrogen purity gas, recycling the enriched hydrogen purity gas to the catalyst zone and utilizing a second portion of the separator recycle gas as a stripping aid to regenerate a second bed of deactivated solid adsorbent maintained at regeneration conditions and periodically switching the first and second beds to continuously produce an enriched hydrogen purity gas.

In each of the above embodiments the regeneration gas, that is the stripping aid together with the stripped components, may be returned to the separation vessel thus increasing the partial pressure of the stripped components in the separation vessel which will drive more stripped components into the liquid phase in the separator and thereby be removed as part of the liquid phase. Alternately the regeneration gas may be removed entirely from the process and used for other purposes. This choice depends on, among other things, whether the process produces hydrogen or consumes hydrogen.

There are many continuous processes in which hydrocarbons are catalytically converted in the presence of hydrogen in which the reaction effluent is separated into a liquid phase and a gaseous phase and at least a portion of the gaseous phase is recycled back to the catalytic reactor. This is usually done to help provide the required hydrogen to charge ratio in the reactor in order to provide the desired selective reactions. If sufficient amount of hydrogen is not provided in the catalytic reactor other undesirable reactions such as polymerization and coke formation will be promoted which in turn can increase the rate of catalyst deactivation. Among the more common catalytic processes in which hydrocarbons are converted in the presence of hydrogen are reforming, hydrocracking, isomerization, hydrodealkylation, hydrogenation and dehydrogenation. In all of these processes, catalysts are employed to promote the desired reactions and in all cases high hydrogen purities of recycle gases generally promote the desired selective reactions and catalyst stability. Some of these processes, such as reforming and dehydrogenation, produce hydrogen as a net product, some consume hydrogen such as hydrogenation, hydrodealkylation and hydrocracking and some theoretically neither consume nor produce hydrogen such as isomerization. The method of this invention is applicable to all three types of processes and is effectively employed to promote catalyst stability and more selective reaction conditions. In all three cases, generally light hydrocarbons such as methane, ethane, propane, etc., are produced in varying amounts in the catalytic reactor and although these components may not poison the catalyst, nevertheless they occupy a part of the recycle gas composition which has the effect of reducing the hydrogen purity and making the hydrogen less available to the catalyst surface. Therefore, by the effect of dilution these light hydrocarbons are undesirable in gases recycled to a catalytic reactor. Other components such as hydrogen sulfide, ammonia, water, carbon monoxide, etc., may actually act as catalyst poisons and their presence in recycle gas is very undesirable. Ideally, the recycle gas should only contain hydrogen.

In a typical hydrocarbon conversion process, the hydrocarbon together with recycle and in some cases make-up gases are passed cocurrently through a fixed bed of catalyst wherein the conversion of the hydrocarbon occurs. The gases generally contain a high percentage of hydrogen, from about 40% to about 95% and sometimes even higher. An effluent is withdrawn from the reactor, cooled and sent into a separation vessel. In the vessel the effluent is separated into a liquid phase and an equilibrium gaseous phase. Generally, at least a portion of the gaseous phase is recycled back to the inlet of the reactor and in some cases additional make-up hydrogen is also introduced into the reactor to replace consumed and/or solution losses. It is important to add more than the required stoichiometric amount of hydrogen to the reactor in order to have a sufficient quantity of hydrogen available in all parts of the reactor to prevent side reactions and the prime purpose of the recycle gas is to maintain a sufficiently high ratio of hydrogen to charge in the reactor. Generally, hydrogen to charge mole ratios of from about 2 to about 20 are preferably employed in continuous hydrocarbon conversion processes and this can only be economically achieved by a recycle gas stream.

It is an object of this invention to increase the hydrogen purity of recycle gases in hydrocarbon conversion units.

It is another object of this invention to treat recycle gases in hydrocarbon conversion processes by contact with a first bed of solid adsorbent and utilizing a portion of the treated recycle gas to help regenerate a second bed of solid adsorbent and periodically switching the first and second beds.

It is still another object of this invention to treat recycle gases in hydrocarbon conversion processes by contact with a first bed of solid adsorbent and utilizing a portion of the untreated recycle gas to help regenerate a second bed of solid adsorbent and periodically switching the first and second beds.

It is still a further object of this invention to promote catalyst stability in a catalytic conversion process by treatment of the recycle gas with a swing bed treater.

It is a more specific object of this invention to disclose a compact efficient recycle gas treating method employing at least two adsorbent beds operated in the swing bed system and using either a portion of the treated gas or the untreated gas to aid in regenerating the adsorbent.

These and other objects will became more apparent in the light of the following detailed description.

The accompany figure is a flow diagram for carrying out the various embodiments of the present invention. The fluid hydrocarbon feed is introduced into flow conduit 1 where it mixes with gas flowing in flow conduit 2 and the resulting mixture passes through flow conduit 3 and into reactor 4 containing catalyst 5. The reactor is operated under such conditions as to carry out the intended reactions and an effluent comprising reacted hydrocarbons and excess hydrogen is withdrawn through flow conduit 6 where it passes into separation vessel 7. Vessel 7 is maintained at conditions to separate the effluent into a liquid phase which is withdrawn through flow conduit 8 and a gaseous phase. The gaseous phase is withdrawn through flow conduit 9 where at least a portion of it flows to one of two parallel beds of solid adsorbent. If there is a net production of gas in the process, the net gas may be removed through valve 24 and flow conduit 25 or alternately all or part of it can be used as a stripping aid to regenerate the adsorbent described hereinafter. It will be assumed to start with that bed 14 is on the adsorption cycle and bed 15 is on the regeneration cycle. The gaseous phase flows through valve 10, flow conduit 12, bed 14, flow conduit 19, valve 21, flow conduit 23, recycle compressor 26 and into flow conduit 2 where it returns to reactor 4. If make-up hydrogen is required it is introduced through flow conduit 27 and valve 28. In one of its embodiments bed 15 is regenerated by taking a portion of the gas flowing in flow conduit 23 and passing it through valve 29, flow conduit 30, heater 44, flow conduit 30, valve 34, flow conduit 36, flow conduit 20, bed 15, flow conduit 13, valve 17 and into flow conduit 18. This treated gas acts as a stripping aid and when heated and passed through bed 15 in a countercurrent direction to the direction of adsorption efficiently strips the adsorbed components off the solid adsorbent. The stripping aid and the stripped components hereinafter called the regeneration gas may be recycled through valve 40 and flow conduit 41 to vessel 7 or alternately may be removed from the process through valve 38 and flow conduit 39. If the regeneration gas is returned to vessel 7, the partial pressure of the stripped components will be increased in vessel 7 and since the gas and liquid phases are in equilibrium, a portion of the stripped components will be driven into the liquid phase and out flow conduit 8.

In an alternative embodiment a portion of the gas phase in flow conduit 9 flows through flow conduit 42, valve 43, flow conduit 30, flow conduit 31, valve 32 (or through heater 44), flow conduit 30, valve 34, flow conduit 36, flow conduit 20, bed 15, flow conduit 13, valve 17 and into flow conduit 18. In this embodiment, preferably bed 15 is maintained at a lower pressure and the combination of lower pressure and separator gas stripping aid function to efficiently strip the adsorbed components off the adsorbent and thereby regenerate the adsorbent. Heater 44 may also be employed to heat the stripping aid and thereby further increase the rate of regeneration. The regeneration gas is preferably withdrawn from the process in this embodiment by flowing through valve 38 and out flow conduit 39 with valve 40 maintained in a closed position. This embodiment is especially preferable in those processes in which hydrogen is evolved such as reforming and dehydrogenation since the net gas can be advantageously employed as the stripping aid. The combination of low pressures and countercurrent stripping of the adsorbed components is an especially effective and efficient method of regeneration.

The process is continually operated in either alternate embodiment (i.e., using treated or untreated gas as stripping aid) until the bed on the adsorption cycle (bed 14) has become deactivated whereupon beds 14 and 15 are switched. This is accomplished by opening valves 11, 16, 22 and 33 and closing valves 10, 17, 21 and 34. In the first mentioned embodiment, the separator vessel gas phase flows through flow conduit 9, valve 11, flow conduit 13, bed 15, flow conduit 20, valve 22, flow conduit 23, recycle compressor 26 and into flow conduit 2 while a portion of the gas in flow conduit 23 is employed as stripping aid by passing through valve 29, flow conduit 30, heater 44, flow conduit 30, valve 33, flow conduit 35, flow conduit 19, bed 14, flow conduit 12, valve 16 and into flow conduit 18. Again the regeneration gas is either returned to separator 7 by flowing through valve 40 and flow conduit 41 or alternately the regeneration gas is removed from the process by flowing through valve 38 and out flow conduit 39. In the second mentioned embodiment a first portion of the separator vessel gas phase flows through flow conduit 9, valve 11, flow conduit 13, bed 15, flow conduit 20, valve 22, flow conduit 23, recycle compressor 26 and into flow conduit 2 while a second portion of the separator vessel gas phase is employed as a stripping aid by flowing through flow conduit 9, flow conduit 42, valve 43, flow conduit 30, flow conduit 31, valve 32, flow conduit 30, valve 33, flow conduit 35, bed 14, flow conduit 12, valve 16, and into flow conduit 18. The regeneration gas is thereupon preferably removed from the process through valve 38 and flow conduit 39 although it may be returned to separator 7 by incorporating a small compressor in flow conduit 42 to provide the necessary driving force. In the event that the process produces hydrogen and all the net gas is not employed as stripping aid, the additional net gas is removed through valve 24 and out flow conduit 25. In processes such as the hydrodealkylation of toluene to produce benzene although there is no net production of gas there is a consumption of hydrogen since one mole of produced benzene consumes one mole of hydrogen and produces one mole of methane and in a case such as this, make-up hydrogen must be introduced into flow conduit 27 and an equal number of moles of regeneration gas and evolved gas must be withdrawn from the process through flow conduits 39 and 25 respectively.

Auxiliary equipment necessary for the proper functioning of the equipment shown in the drawing such as pumps, heat exchangers, reactor heaters, coolers, control valves, means for actuating control valves, etc., have been omitted in the interest of brevity and simplicity. However, it is to be understood that this auxiliary equipment is necessary for the process to function although its selection is within the ordinary skill of a process and instrumentation engineer.

In the hydrocracking process a heavy oil feed such as a vacuum gas oil, cat cracked cycle oil, etc., is introduced into flow conduit 1. The reactor contains a catalyst comprising at least one Group VIII metal on an acidic support. The reactor is preferably operated at temperatures of from about 500 F. to about 900° F., pressure of from about 500 p.s.i.g. to about 4000 p.s.i.g., liquid hourly space velocities (LHSV) of from about 0.1 to about 10 and recycle gas rates of from about 3000 to about 50,000 standard cubic feet/barrel of feed. The heavy oil is catalytically cracked in the presence of hydrogen to form a lighter oil and thereby consumes hydrogen. A small amount of light hydrocarbons such as methane and ethane are formed in the reaction and tend to reduce the hydrogen purity in the recycle gas. The reacted products are sent into separator 7 and the gaseous phase is recycled to the reactor. According to the method of this invention, this recycled gaseous phase is contacted with a bed of active solid adsorbent to enrich the hydrogen purity and thereafter is returned to the reactor. In this process I prefer the embodiment wherein the entire separator gaseous phase flows into the absorbent bed on the adsorption cycle, and a portion of the treated gas is employed as a stripping aid. This is efficiently accomplished since this position represents an incremental loading on the existing recycle compressor which provides adequate driving force to return the regeneration gas to separator vessel 7. Preferably this stripping aid portion is heated to temperatures as high as about 500° F., passed countercurrently through the adsorbent bed on the regeneration cycle and returned to separator 7. It is preferable not to remove the regeneration gas from the process in this case since the process consumes hydrogen and by removing the regeneration gas, a large expensive make-up stream of hydrogen would be required. Furthermore, since hydrocracking is a high pressure process, separator 7 is maintained at a high pressure which tends to drive a substantial portion of the stripped components into the liquid phase and it is economical to return the regeneration gas to separator 7. Generally, less than 10 percent of the treated gas is required as stripping aid to effectively regenerate the bed on the regeneration cycle. Therefore, when operating the process of this invention in conjunction with a hydrocracking process, valves 29 and 40 are maintained open while valves 43, 32 and 38 are maintained closed.

In the reforming process, a feed charge stock having from about 6 carbon atoms to about 11 carbon atoms per molecule is introduced into flow conduit 1. These stocks usually are naphthas produced from crude oil by distillation and contain an appreciable concentration of naphthenes and paraffins. The reactor contains a reforming catalyst, preferably a supported platinum-halogen catalyst and especially a platinum-chloride catalyst on an alumina support. The reaction is preferably operated at temperatures of from about 850° F. to about 1000° F., pressures of from about 100 p.s.i.g. to about 800 p.s.i.g., LHSV of from about 0.1 to about 10 and hydrogen to charge mole ratios of from about 2 to about 20. In the reactor the feed is subjected to dehydrogenation, hydrocracking, isomerization and dehydrocyclization reactions with a net production of both hydrogen and light hydrocarbons such as methane, ethane and propane. Lower reforming reactor pressures promote the desired dehydrogenation and dehydrocyclization reactions but also increase the rate of catalyst deactivation and usually sufficiently high pressures are selected to maintain reasonable catalyst deactivation rates. The reactor effluent is sent into separator 7 and a portion of the gaseous phase is recycled to the reactor to provide the required hydrogen to charge mole ratio. According to the method of this invention, this recycled gaseous phase portion is contacted with a bed of active solid adsorbent to selectively remove the non-hydrogen components from the gas and thereby produce an enriched hydrogen purity treated recycle gas which is directly returned to the reactor. In this process I prefer the embodiment in which the remaining portion of the separation gas is employed for stripping aid to regenerate the bed of adsorbent on the regeneration cycle. Accordingly, a second portion of the separator gas passes through flow conduit 42, and countercurrently strips the adsorbed components off the spent solid adsorbent in the bed on the regeneration cycle. This backpurging with stripping aid is combined with maintaining lower pressures in the bed to effectively remove the adsorbed components off the adsorbent. Preferably the pressure in the bed on the regeneration is no higher than one-third of the pressure in the bed on the adsorption cycle. Pressures as low as atmospheric or even vacuum may also be advantageously employed since the lower the pressure employed in the regeneration step the more rapid the rate of regeneration. This type of regeneration is preferably carried out as follows. When bed 14 is on the adsorption cycle, bed 15 is first depressured by opening valves 17 and 38 (flow conduit 39 is connected to a low pressure source) while maintaining valves 11, 22, 40 and 34 closed. When bed 15 has been sufficiently depressured, valve 34 is partially opened so as to control the rate of stripping aid, and stripping aid passes countercurrently through bed 15 until the regeneration is completed. Thereupon valve 17 closes which permits bed 15 to be pressured up to operating pressure. Bed 15 is now ready to be swung onto the adsorption cycle and when bed 14 has become spent, the beds are swung as described hereinbefore. Bed 14 is in a similar manner regenerated by first depressuring, then passing stripping aid conutercurrently through the adsorbent and finally repressuring up the bed. In many cases sufficiently low pressures are employed such that it is not necessary to use the entire net gas from the separator as stripping aid and a portion of the net gas is removed through flow conduit 25 at substantially separator pressure for use elsewhere. When using atmospheric pressure regeneration of the spent adsorbent as little as 10% of the net separator gas is employed as stripping aid. It is preferable to remove the regeneration gas from the process for in this reforming case the process produces hydrogen and also the separator is maintained at the lower reforming pressures making it more difficult to drive the stripped components into the liquid product.

Any adsorbent having a selectivity for light hydrocarbons such as methane, ethane, propane, etc., as well as for other contaminants such as hydrogen sulfide, water, ammonia, etc., over hydrogen is suitable for use in this process. Among the more preferable adsorbents are molecular sieves, silica gel, activated alumina and activated carbon. Other well known adsorbents may also be employed to give similar results. In those processes in which the recycle gas contains substantially only light hydrocarbons as the non-hydrogen components, activated carbon is an especially preferable adsorbent. The adsorbent preferably comprises solid particles of a size range of from about 10 mesh to about 60 mesh and is loaded in a fixed bed into vessels 14 and 15. This size range is preferable since it will result in a significant pressure drop in the direction of flow through the fixed bed thereby insuring efficient contact of the gas with the solid adsorbent and preventing channeling and bypassing of a portion of the bed.

The bed on the adsorption cycle is maintained at the same pressure as in separation vessel 7 (except for pressure drop due to the flow of recycle gas through the flow conduits and fixed bed of adsorbent). Although the adsorption of non-hydrogen components is thought to be due to electrostatic and capillary action forces, the mechanism of adsorption is not completely understood. Generally, the loading of non-hydrogen component on the adsorbent increases as the pressure increases at a constant temperature and decreases as the temperature increases at constant pressure. The adsorbed components can be compared to a liquid on the adsorbent which exert a vapor pressure. When the adsorbent has become fully saturated with adsorbed components, the vapor pressure equals the partial pressure and further adsorption of non-hydrogen components is not possible for the difference between the partial pressure of the non-hydrogen components of the recycle gas and the vapor pressure is the driving force that causes adsorption. When the adsorbent is fully saturated with an adsorbed component, the partial pressure equals the vapor pressure and the adsorbent is characterized as being fully spent. When the adsorbent does not contain any adsorbed components it is characterized as being fully active. A spent adsorbent can be regenerated by removing the adsorbed components from the adsorbent. This is readily accomplished by any of three methods; namely, (1) employing a stripping aid, (2) employing low pressures and (3) employing high temperatures. In methods (1) and (2) the partial pressure of adsorbed components is lowered and in method (3) the vapor pressure of adsorbed components is increased. When the vapor pressure exceeds the partial pressure, the adsorbed components pass from the adsorbent to the surrounding gas thereby regenerating the adsorbent. Combinations of methods (1), (2) and (3) are especially effective in regenerating the bed of spent adsorbent. Thus, when using a hydrogen consuming high pressure process such as hydrocracking the combination of an enriched hydrogen purity stripping aid and elevated temperatures are especially effective to regenerate the bed of spent adsorbent. When using a hydrogen producing process such as reforming, the combination of recycle gas stripping aid and lower pressures are especially effective to regenerate the bed of spent adsorbent.

The throughput of recycle gas through the bed on the adsorption cycle is dependent on such factors as recycle gas composition, desired enriched hydrogen purity, temperature, pressure, method of regeneration, and the time required for swinging beds. It is expected that gas hourly space velocities (standard cubic feet of gas per hour divided by cubic feet of adsorbent, GHSV) within the range of from about 100 to about 10,000 and preferably from about 500 to about 5000 will be employed. However, when it is desired to remove a trace component a higher GHSV can be employed or when the recycle gas contains a very low concentration of hydrogen (less than about 60%) lower GHSV's can be employed. The times employed in which one bed is maintained on an adsorption cycle before swinging is preferably from about 2 minutes to about 2 to 4 hours. When employing low pressures in the bed on the regeneration cycle, GHSV is not the limiting factor in many commercial installations but rather the limitation is the time required for the depressuring and repressuring steps. Therefore when swinging beds using low pressures on the regeneration cycle the minimum time is about 2 to about 10 minutes in order to utilize reasonably sized equipment.

The following examples are presented hereinafter to further illustrate the method of this invention but it is not intended to limit the invention to the materials and substances shown therein.

*Example I*

This example is presented to illustrate the improvement in hydrogen purity of a recycle gas containing hydrogen methane and carbon monoxide in which low pressures and stripping aid are employed to regenerate the adsorbent bed on the regeneration cycle. A recycle gas whose composition is shown in column 1 of Table 1 is withdrawn from separator 7 at a pressure of 400 p.s.i.g. and a rate of 7,140,000 standard cubic feet per day (s.c.f.d.). Each bed is loaded with 26,000 pounds of activated carbon. The bed on the regeneration cycle is depressured to about 20 p.s.i.a. at its lowest point in the regeneration cycle. Treated recycle gas whose composition is shown in column 2 of Table 1 is withdrawn through flow conduit 23 at a rate of 4,130,000 s.c.f.d. and regeneration gas whose composition is shown in column 3 of Table 1 is withdrawn through flow conduit 39 at a rate of 3,010,000 s.c.f.d. It should be noted that the hydrogen purity of the recycle gas is increased from about 71 mole percent to about 95 mole percent.

TABLE 1

| Component: | Column 1 Separator Gas, s.c.f.d. | Column 2 Treated Gas, s.c.f.d. | Column 3 Regeneration Gas, s.c.f.d. |
|---|---|---|---|
| $H_2$ | 5,120,000 | 4,000,000 | 1,120,000 |
| $CH_4$ | 2,000,000 | 130,000 | 1,870,000 |
| $CO$ | 20,000 | Trace | 20,000 |

*Example II*

This example is presented to show the effect of treating the recycle gas by the method of this invention to produce an enhanced hydrogen purity gas on a reforming process. A reforming catalyst comprising 0.75% by weight platinum and 0.9% by weight chlorine on alumina weighing 52.5 grams and occupying a volume of 100 cc. is loaded into a block type isothermal reactor. The reactor is part of a pilot plant having additional auxiliary equipment including a high pressure separator vessel, a debutanizer fractionating column, a recycle separator gas compressor, a charge pump, two beds of activated carbon adsorbent and means for switching the beds as described hereinbefore. For the first portion of this example the adsorbent beds are bypassed. The catalyst is prereduced, predried and brought up in temperature to 700° F. in the presence of a hydrogen purge stream. A desulfurized light Kuwait naphtha having a 160° F. initial boiling point, a 276° F. end point, a 98.1 molecular weight, a 69.5° API specific gravity, a paraffin content of 70% by volume, a naphthene content of 17% by volume, an aromatic content of 4% by volume and having an octane number of 50 F–1 clear is introduced into said reactor at a rate of 100 cc./hr. while maintaining a pressure of 200 p.s.i.g. and a 7 hydrogen/charge mole ratio by means of a separator recycle compressor in the reactor. The temperature of the reactor is thereupon increased until the debutanized reformate has an F–1 clear octane number of about 94.5. The charge stock is continually processed over the catalyst until 3.75 barrels of charge stock per pound of catalyst (b.p.p.) have passed over said catalyst. During this period the temperatures are adjusted upward daily in order to maintain a debutanized reformate of about 94.5 F–1 clear octane number. It is estimated that the catalyst deactivation rate which can be measured by the change in temperature divided by the change in catalyst life (° F. per barrel of charge stock per pound of catalyst) at said 3.75 b.p.p. is about 7.3 ° F./b.p.p. A material balance is made around the pilot plant at this point in time and the results are presented in column 1 of Table 2. After completing the run, the pilot plant is shut down and the catalyst is removed from the reactor.

Another batch of the same reforming catalyst as used above weighing 51.3 grams and occupying a volume of 100 cc. is loaded into the same reactor located in the same pilot plant. In this run the adsorbent beds are connected into the recycle gas stream and flow conduit 39 is connected to a vacuum pump. The beds are operated as described hereinbefore with less than about 20% of the net separator gas being employed as a stripping aid and low pressures of about as much as 1 p.s.i.a. being employed in the bed on the regeneration cycle. The hydrogen purity in the recycle gas is maintained at about 99 mole percent which permits the reactor pressures to be lowered to about 100 p.s.i.g. The plant is started up as above and run until about 3.75 b.p.p. have passed over the catalyst. Again, the temperatures are raised during the run to maintain a debutanized reformate F–1 clear octane number of 94.5. A material balance is made around the pilot plant at the 3.74 b.p.p. catalyst life and the results are presented in column 2 of Table 2. It should be noted that even though the reactor pressure is 100 p.s.i.g., by employing a high hydrogen purity recycle gas the catalyst deactivation rate is about 5.0 ° F./b.p.p. and at the same time this operation increases the yield of high octane gasoline.

TABLE 2

| Operating Conditions in Reactor | Column 1 Untreated Recycle Gas | Column 2 Treated Recycle Gas |
|---|---|---|
| Pressure, p.s.i.g | 200 | 100 |
| LHSV (l./hr.) | 0.95 | 1.02 |
| Hydrogen/Hydrocarbon mole ratio | 7.0 | 5.3 |
| Calalyst life, b.p.p | 3.75 | 3.74 |
| Catalyst Deactivation Rate, ° F./b.p.p | 7.3 | 5.0 |
| Reformate Produced: | | |
| Octane Number F–1 Clear | 93.5 | 94.2 |
| $C_5+$ yield, volume percent of feed | 65.5 | 70.1 |
| Hydrogen yield, s.c.f./bbl. of feed | 820 | 940 |

The results show that employing an adsorbent bed to enhance the hydrogen purity of the recycle gas increases catalyst stability and also allows advantageous operating conditions which in turn increases the gasoline yield.

Example III

This example is presented to illustrate the improvement in hydrogen purity of a recycle gas containing hydrogen and methane in which high temperatures and stripping aid are employed to regenerate the adsorbent bed on the regeneration cycle and the resultant effect on a reforming process. A reforming catalyst comprising 0.375% by weight platinum and 0.9% by weight chlorine on alumina weighing 52 grams and occupying a volume of 100 cc. is loaded into a block type isothermal reactor in a pilot plant similar to that of Example II. The adsorbent beds for treating the recycle gas are loaded with activated alumina. The adsorbent beds are bypassed and the catalyst is prereduced, predried and brought up in temperature to 700° F. in the presence of a hydrogen purge stream. A charge stock having an API gravity of 51.9, an initial boiling point of 235° F., an end point of 403° F. and a sulfur content of 9.0 p.p.m. by weight is introduced into the catalytic reactor at a rate of 120 cc./hr. The reactor is maintained at a pressure of 300 p.s.i.g. and a hydrogen/charge mole ratio of about 10 and temperatures are adjusted daily to hold a reformate F–1 clear octane number of 100. The run is continued until about 4 b.p.p. of catalyst life has accumulated. The results of this run is presented in column 1 of Table 3.

Another batch of the same catalyst as used in the first portion of Example III weighing 52 grams and occupying a volume of 100 cc. is loaded into the same reactor. In this run the adsorbent beds are connected to the recycle gas stream and a heating coil is wrapped around each bed. The electric circuit is set up to heat the bed on the regeneration cycle to a temperature of about 500° F. and the stripping aid is contacted with a preheater to raise its temperature to 500° F. prior to entering the bed on the regeneration cycle. All of the net separator gas is heated to 500° F. and passes countercurrently through the bed on the regeneration cycle and is withdrawn from the reforming process at substantially the separator pressure. The reactor is maintained at a pressure of 300 p.s.i.g., a hydrogen/charge mole ratio of about 10 and an LHSV of 1.2 and temperatures are adjusted daily to hold a reformate F–1 clear octane number of 100. The run is continued until about 5.5 b.p.p. of catalyst life has accumulated. The results of this run are presented in column 2 of Table 3.

TABLE 3

| | Column 1 Untreated Recycle Gas | Column 2 Treated Recycle Gas |
|---|---|---|
| Reactor conditions: | | |
| LHSV | 1.2 | 1.2 |
| Pressure, p.s.i.g. | 300 | 300 |
| $H_2$/Charge ratio, mole | 10 | 10 |
| $H_2$ purity recycle gas | 83.7 | 93 |
| Octane Number | 100 | 100 |
| Yield decline, $C_5$+L.V., percent/b.p.p. | 1.4 | 0.24 |
| Catalyst deactivation ° F./b.p.p. | 13 | 4 |

Comparison of the above results shows that catalyst stability has significantly improved from 13° F./b.p.p. to 4° F./b.p.p. as a result of treating the recycle gas with the adsorbent beds. Additionally, the yield stability has also improved from 1.4 liquid volume percent/b.p.p. to 0.24 liquid volume percent/b.p.p.

Example IV

Another run using high temperatures and stripping aid to regenerate the bed on the regeneration cycle is performed on a hydrocracking process in which a nickel-molybdenum catalyst on a silica-alumina support is employed in a fixed catalyst bed. The adsorbent beds are loaded with activated carbon. The hydrocracking reactor is operated at pressures of 2000 p.s.i.g., LHSV of about 0.75 and recycle gas rates of 10,000 s.c.f./bbl. The charge stock is a vacuum gas oil. A portion of the treated recycle gas from the outlet of the recycle compressor is heated to a temperature of 500° F. and passed countercurrently through the bed on the regeneration cycle and the effluent regeneration gas is returned to the high pressure separator. Operation of the hydrocracking process with and without the method of this invention confirms the increase in purity of the recycle gas and the increase in hydrocracking catalyst stability as a result of contacting the recycle gas with the adsorbent bed.

I claim as my invention:

1. In a process for the conversion of a hydrocarbon charge stock in the presence of hydrogen in a conversion zone in which at least a portion of the gaseous hydrogen effluent from the conversion zone which is separated from liquid hydrocarbon product in a gravity type separation vessel is recycled back to the inlet of the conversion zone, the improvement which comprises contacting at least a portion of the recycled gas with a first active solid adsorbent bed to produce a gas stream of enriched hydrogen purity and contacting a first portion of the enriched hydrogen purity gas at regeneration conditions with a second spent adsorbent bed to regenerate the spent solid adsorbent therein and returning the remaining portion of the enriched hydrogen purity gas to the inlet of the conversion zone and therein effecting said conversion in the presence of said enriched hydrogen purity gas, and returning the gas evolved from said spent bed undergoing regeneration to said separation vessel.

2. The process of claim 1 further characterized in that after the first bed has become substantially spent, the first and second beds are switched to utilize the second bed to produce enriched hydrogen purity gas while regenerating the first bed and thereafter periodically switching the beds to continuously produce an enriched hydrogen purity gas stream 3. The process of claim 2 further characterized in that the first portion of the enriched hydrogen purity gas is heated to an elevated temperature prior to contacting the bed of spent adsorbent.

4. The process of claim 2 further characterized in that the first portion of the enriched hydrogen purity gas is reduced to a lower pressure prior to contacting the bed of spent adsorbent.

5. In a process for the catalytic conversion of a hydrocarbon charge stock in the presence of hydrogen in a fixed bed catalyst zone which comprises passing the hydrocarbon and hydrogen through the inlet of the bed of catalyst, withdrawing from the outlet of the catalyst zone an effluent and introducing the effluent into a gravity type separation vessel, separating the effluent therein into a liquid phase and a gaseous phase and recycling at least a portion of the gaseous phase to the inlet of the catalyst zone, the improvement which comprises treating the gaseous phase by introducting at least a portion of the gaseous phase into one end of a first bed of active solid adsorbent and withdrawing a gaseous stream of enriched hydrogen purity from the other end of the first bed of adsorbent and returning a first portion of the treated gas to the inlet of said catalyst zone and therein effecting said catalytic conversion in the presence of said enriched hydrogen purity gas, while passing another second portion of the treated gas into another end of a second bed of deactivated solid adsorbent maintained at regeneration conditions and withdrawing a regeneration gas from one end of the second bed to regenerate the adsorbent in the second bed and thereafter switching the first and second bed by stopping the flow of the gaseous phase portion through the first bed while substantially simultaneously introducing the gaseous phase portion into said one end of the second bed and withdrawing a gaseous stream of enriched hydrogen purity from the other end of the second bed of adsorbent too maintain a continuously returning stream of enriched hydrogen purity gas to the catalyst zone inlet and regenerating the first bed of adsorbent by passing a portion of the enriched hydrogen purity gas through the other end of the first bed maintained at regeneration conditions and withdrawing a regeneration gas from the one end of the first bed and continuously maintaining a stream of enriched hydrogen purity gas flowing to the catalyst zone inlet by periodically switching the first and second beds of adsorbent, and returning to said separation vessel the regeneration gas evolved from the other end of the bed being regenerated.

6. The process of claim 5 further characterized in that the second portion of the enriched hydrogen purity gas is heated to an elevated temperature prior to contacting the bed being regenerated.

7. The process of claim 5 further characterized in that the second portion of the enriched hydrogen purity gas is reduced to a lower pressure prior to contacting the bed being regenerated.

References Cited

UNITED STATES PATENTS

| | | | |
|---|---|---|---|
| 3,212,236 | 10/1965 | Skarstrom et al. | 208—138 |
| 3,037,338 | 6/1962 | Thomas | 260—676 |
| 3,141,748 | 7/1964 | Hoke et al. | 208—95 |

ABRAHAM RIMENS, *Primary Examiner.*

DELBERT E. GANTZ, *Examiner.*